(12) United States Patent
Shimizu

(10) Patent No.: US 12,348,702 B2
(45) Date of Patent: Jul. 1, 2025

(54) ELECTRONIC DEVICE AND METHOD FOR CONTROLLING ELECTRONIC DEVICE

(71) Applicant: CANON KABUSHIKI KAISHA, Tokyo (JP)

(72) Inventor: Rurika Shimizu, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 273 days.

(21) Appl. No.: 18/167,970

(22) Filed: Feb. 13, 2023

(65) Prior Publication Data
US 2023/0269360 A1 Aug. 24, 2023

(30) Foreign Application Priority Data

Feb. 18, 2022 (JP) .................. 2022-023654
Dec. 7, 2022 (JP) .................. 2022-195646

(51) Int. Cl.
| | |
|---|---|
| H04N 13/354 | (2018.01) |
| G06F 3/14 | (2006.01) |
| G06V 10/25 | (2022.01) |
| H04N 23/698 | (2023.01) |

(52) U.S. Cl.
CPC ............ *H04N 13/354* (2018.05); *G06F 3/14* (2013.01); *G06V 10/25* (2022.01); *H04N 23/698* (2023.01)

(58) Field of Classification Search
CPC .... H04N 13/354; H04N 23/698; H04N 23/50; H04N 23/62; H04N 23/667; G06F 3/14; G06F 3/0482; G06V 10/25; G06T 3/40; G06T 19/006
See application file for complete search history.

(56) References Cited

U.S. PATENT DOCUMENTS

| | | | |
|---|---|---|---|
| 6,414,685 B1* | 7/2002 | Takakura | G06T 13/00 345/475 |
| 2016/0005435 A1 | 1/2016 | Campbell et al. | |
| 2018/0121069 A1 | 5/2018 | DiVerdi et al. | |
| 2020/0036937 A1 | 1/2020 | Zhou | |
| 2021/0287446 A1 | 9/2021 | Hamada et al. | |

FOREIGN PATENT DOCUMENTS

| | | |
|---|---|---|
| JP | 2005223416 A | 8/2005 |
| JP | 2014165763 A | 9/2014 |

OTHER PUBLICATIONS

Combined Search and Examination Report issued on Aug. 14, 2023, in corresponding Great Britain Patent Application No. GB2302015.9 (7 pages).

* cited by examiner

*Primary Examiner* — Daniel F Hajnik
*Assistant Examiner* — Adeel Bashir
(74) *Attorney, Agent, or Firm* — Venable LLP

(57) ABSTRACT

An electronic device sequentially displays a plurality of frame images of a moving content on a screen and displays a timeline area corresponding to a reproduction period of the plurality of frame images on the screen. The electronic device calculates a position on a track connecting reference positions of a first frame image and a second frame image, sets the calculated position as the reference position of the third frame image, and sets a plurality of fourth frame images existing in a specified period specified by a user to maintain one reference position specified by the user. The electronic device displays the specified period and other periods separately in the timeline area, and displays regions corresponding to the reference positions set for each of the plurality of frame images in sequence on the screen.

16 Claims, 10 Drawing Sheets

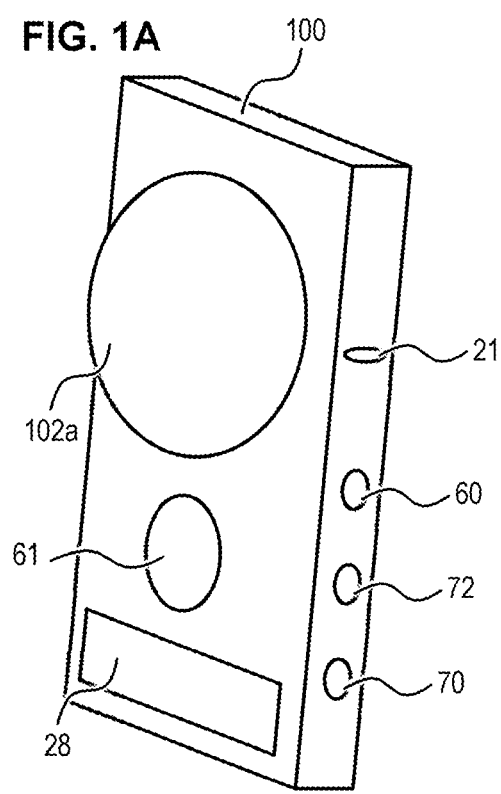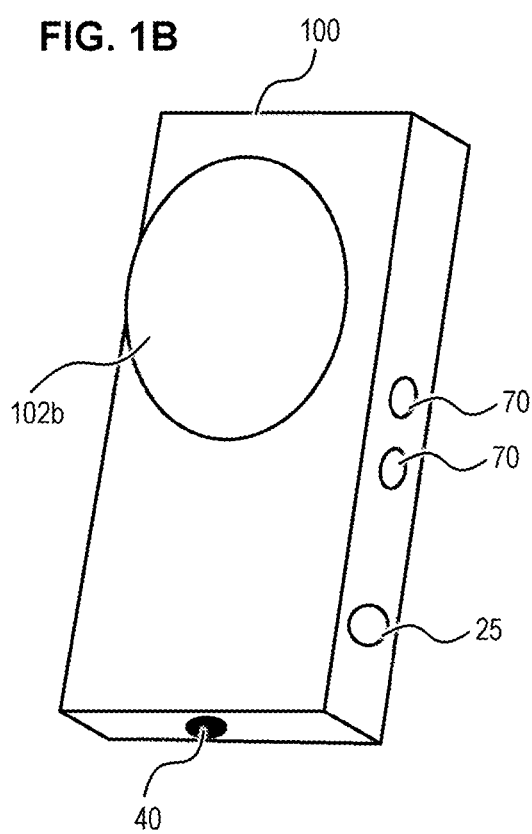

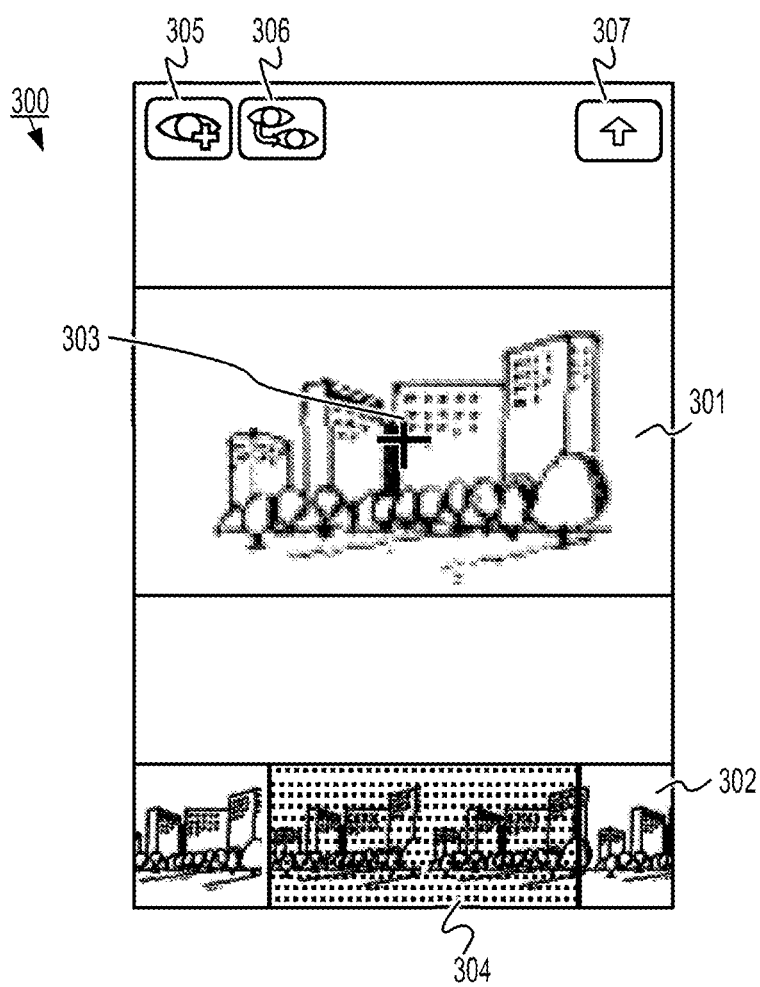

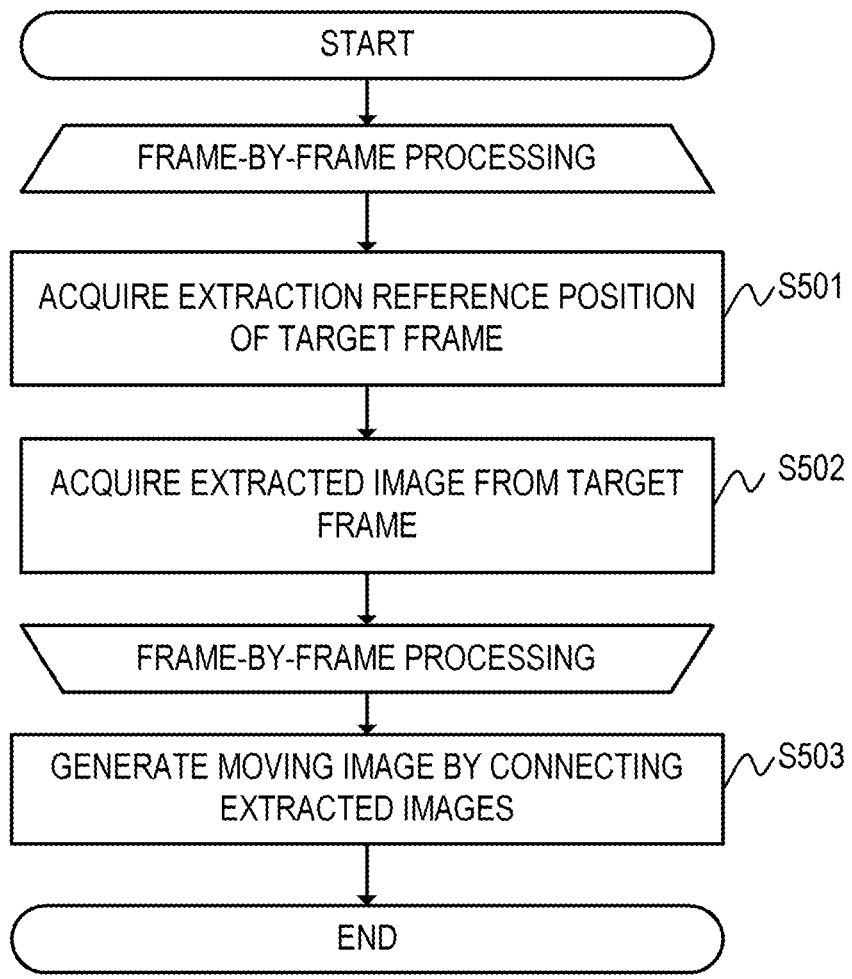

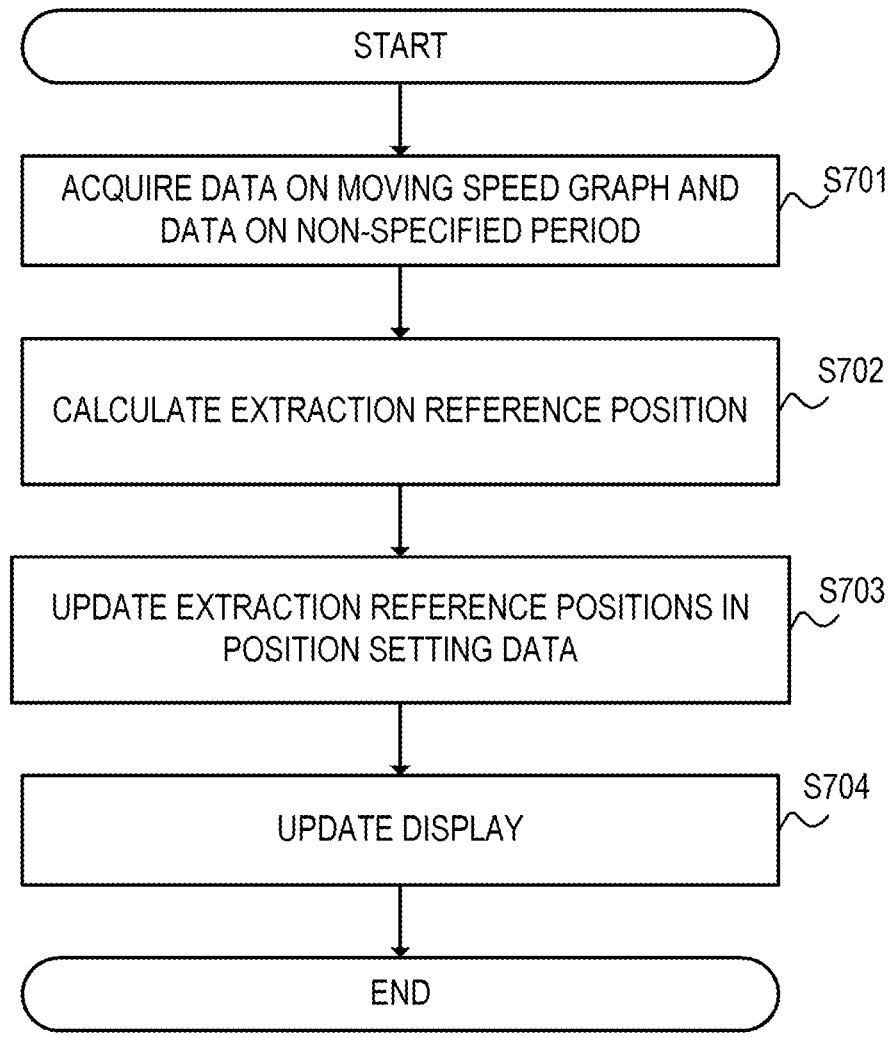

ELECTRONIC DEVICE AND METHOD FOR CONTROLLING ELECTRONIC DEVICE

CROSS REFERENCE TO PRIORITY APPLICATION

This application claims the benefit of Japanese Patent Application No. 2022-023654, filed on Feb. 18, 2022, and Japanese Patent Application No. 2022-195646, filed on Dec. 7, 2022, which are hereby incorporated by reference herein in their entirety.

BACKGROUND OF THE INVENTION

Field of the Invention

The present invention relates to an electronic device and a method of controlling the electronic device.

Description of the Related Art

There are platforms and apparatuses that can reproduce and share VR content (e.g., omnidirectional images, omnidirectional panoramic images).

Here, in order to convert the VR content into images that can be easily handled, a method of extracting a region, of which an angle-of-view is narrower than the VR content, from the VR content, is known. The extraction angle-of-view can be specified for each frame by user operation.

Japanese Patent Application Publication No. 2014-165763 and Japanese Patent Application Publication No. 2005-223416 disclose techniques that can specify an arbitrary position in a VR content by user operation, and extract (select) an image in a range centering around this position (range narrower than the original VR content).

However, if the techniques disclosed above are used to extract (select) regions for all of the frames of the VR content, the user must specify the positions for all the frames. This requires many operation steps for the user, and is time consuming.

SUMMARY OF THE INVENTION

With the foregoing in view, the present invention allows the user to easily select a part of a region from the content.

An aspect of the invention is an electronic device that reproduces a moving image content, including a display control unit configured to control to sequentially display a plurality of frame images including the moving image content on a screen and display a time line area, which corresponds to a reproduction period of the plurality of frame images, on the screen a calculation unit configured, for a third frame image, of which a reference position has not been set yet, existing between a first frame image and a second frame image, which are two frame images of which reference positions have been set, to calculate a position on a track connecting a first reference position of the first frame image and a second reference position of the second frame image, a setting unit configured to automatically set the calculated position as a third reference position of the third frame image, and for a plurality of fourth frame images existing in a specified period, which is specified in the time line area in accordance with an operation by a user, automatically set one fourth reference position which is specified in accordance with an operation by the user so that the one fourth reference position is maintained, and a control unit configured to control operation to display the specified period and other periods separately in the time line area on the screen, and control operation to reproduce the moving image content by sequentially displaying regions corresponding to reference positions which are set for the plurality of frame images respectively on the screen.

An aspect of the invention is a method of controlling an electronic device that reproduces a moving content, including steps of controlling operation to sequentially display a plurality of frame images including the moving image content on a screen, and display a time line area, which corresponds to a reproduction period of the plurality of frame images, on the screen, for a third frame image, of which a reference position has not yet been set, existing between a first frame image and a second frame image, which are two frame images of which reference positions have been set, calculating a position on a track connecting a first reference position of the first frame image and a second reference position of the second frame image, automatically setting the calculated position as a third reference position of the third frame image, for a plurality of fourth frame images existing in a specified period, which is specified in the time line area in accordance with an operation by a user, automatically setting one fourth reference position which is specified in accordance with an operation by the user so that the one fourth reference position is maintained; controlling to display the specified period and other periods separately in the time line area on the screen; and controlling to reproduce the moving image content by sequentially displaying regions corresponding to reference positions that are set for the plurality of frame images respectively on the screen.

Further features of the present invention will become apparent from the following description of exemplary embodiments with reference to the attached drawings.

BRIEF DESCRIPTION OF THE DRAWINGS

FIGS. 1A to 1C are diagrams depicting a digital camera;
FIGS. 3A to 3C are a diagram and tables for describing display control processing;
FIG. 5 is a flow chart of moving image generation processing;
FIG. 7 is a flow chart of the speed control processing.

DESCRIPTION OF THE EMBODIMENTS

Figure 1C:
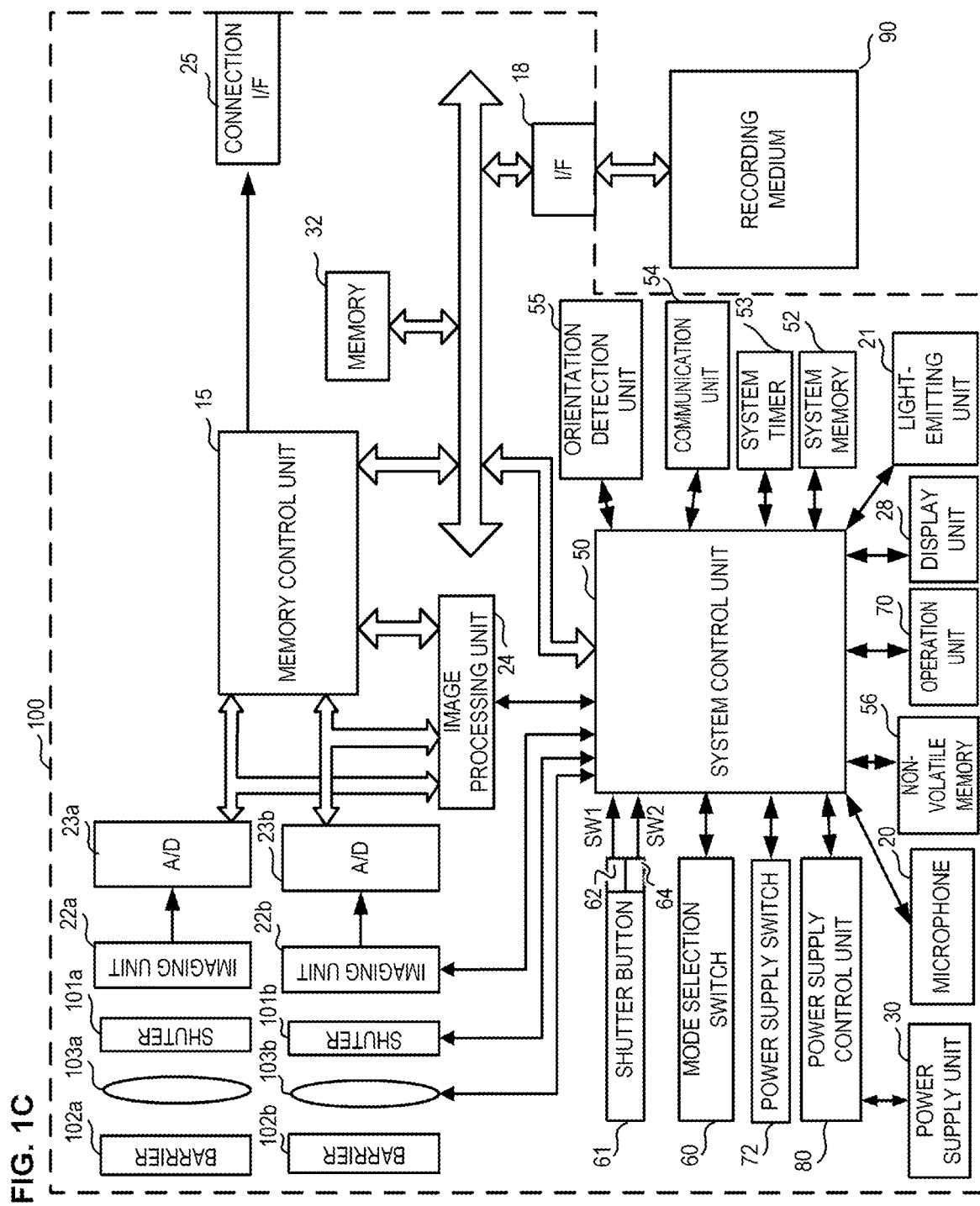

A technique to systematically and automatically set a position to be a reference of extraction (extraction reference position) may be possible. For example, the extraction reference position at each timing between a first timing and a second timing is set such that the extraction reference position of the first timing changes to the extraction reference position at the second timing. With this technique, however, in a case when the extraction reference position is set at a same position for each timing between the first timing and the second timing, the user must manually set the same extraction reference position for both the first timing and the second timing. Therefore, in the following embodiments, a technique to set extraction reference positions between two timings to a same position more easily is described.

Embodiments of the present invention will be described with reference to the drawings. The following embodiments, however, are not intended to limit the present invention according to claims, and not all the combinations of the features described in the present embodiments are essential as solutions to the problem disclosed in the present invention. In the following description, a same composing element is denoted with a same reference sign. Each of the embodiments of the present invention described below can be implemented solely or as a combination of a plurality of the embodiments or features thereof where necessary or when the combination of elements or features from individual embodiments in a single embodiment is beneficial.

Embodiment 1

Embodiment 1 of the present invention will be described with reference to the drawings. FIG. 1A is a front perspective view (external view) of a digital camera 100 (imaging apparatus), which is an electronic device. FIG. 1B is a rear perspective view (external view) of the digital camera 100. The digital camera 100 is an omnidirectional camera.

A barrier 102a is a protective window of an image capturing lens 103a for a "camera portion A", of which image capturing range is on the front side of the digital camera 100. The barrier 102a may be an outer surface of the image capturing lens 103a itself. The "camera portion A" is a wide angle camera, of which image capturing range is a wide range (at least 180° in the up, down, left and right directions) on the front side of the digital camera 100. A barrier 102b is a protective window of an image capturing lens 103b for a "camera portion B", of which image capturing range is on the rear side of the digital camera 100. The barrier 102b may be an outer surface of the image capturing lens 103b itself. The "Camera portion B" is a wide angle camera, of which image capturing range is a wide range (at least 180° in the up, down, left and right directions) on the rear side of the digital camera 100.

A display unit 28 is a display unit to display various information. A shutter button 61 is an operation unit to instruct operation to capture an image. A mode selection switch 60 is an operation unit to switch various modes. A connection I/F 25 is a connector between a connection cable to connect with an external device (e.g., a smartphone, a personal computer, a TV), and the digital camera 100. The operation unit 70 is an operation unit constituted of operation members to accept various operations from the user (e.g., various switches, buttons, dial, touch sensor). A power supply switch 72 is a push button to switch power ON/OFF.

A light-emitting unit 21 is a light-emitting member, such as a light-emitting diode (LED). The light-emitting unit 21 notifies the user on various states of the digital camera 100 by a light-emitting pattern or an emission color. A fixing unit 40 is a tripod screw hole, for example, and is a member to install the digital camera 100 to such a fixing device as a tripod.

FIG. 1C is a block diagram depicting a configuration example of the digital camera 100. The barrier 102a covers the imaging system of the "camera portion A" of the digital camera 100, including the image capturing lens 103a, so as to prevent contamination of and damage to the imaging system (including the image capturing lens 103a, a shutter 101a, and an imaging unit 22a). The image capturing lens 103a is a lens group, and includes a zoom lens and a focus lens. The image capturing lens 103a is a wide angle lens, for example. The shutter 101a is a shutter that has an aperture function, to adjust a quantity of a subject light that enters the imaging unit 22a. The imaging unit 22a is an image pickup element constituted of a CCD, a CMOS element, or the like, which converts an optical image into electrical signals. An A/D convertor 23a converts analog signals, which are outputted from the imaging unit 22a, into digital signals.

The barrier 102b covers the imaging system of the "camera portion B" of the digital camera 100, including the image capturing lens 103b, so as to prevent contamination of and damage to the imaging system (including the image capturing lens 103b, the shutter 101b and the imaging unit 22b). The image capturing lens 103b is a lens group, and includes a zoom lens and a focus lens. The image capturing lens 103b is a wide angle lens, for example. The shutter 101b is a shutter that has an aperture function, to adjust a quantity of a subject light that enters the imaging unit 22b. The imaging unit 22b is an image pickup element constituted of a CCD, a CMOS element, or the like, which converts an optical image into electrical signals. An A/D convertor 23b converts analog signals, which are outputted from the imaging unit 22b, into digital signals.

A VR image is captured by the imaging unit 22a and the imaging unit 22b. The VR image is an image that can be VR-displayed. The VR image includes an omnidirectional image captured by an omnidirectional camera, and a panoramic image having an image range (effective imaging range) that is wider than the display range that can be displayed all at once on the display unit. The VR image includes not only a still image, but also a moving image and a live-view image (image acquired from the camera in near real-time). The VR image has an image range of the visual field (effective image range) that is a maximum 360° in the vertical direction (vertical angle, angle from zenith, elevation angle, depression angle, altitude angle), and 360° in the horizontal direction (horizontal angle, azimuth angle). Further, the VR image includes an image having a wide angle-of-view (visual field range) that is wider than the angle-of-view which can be captured by a standard camera, or an image having an image range (effective image range) that is wider than the display range that can be displayed on the display unit all at once, even if the imaging range is less than 360° vertically and less than 360° horizontally. For example, an image captured by an omnidirectional camera, which can capture subjects that exist in a visual field (in an angle-of-view) of 360° in the horizontal direction (horizontal angle, azimuth angle), and in a 210° vertical angle with the zenith at the center, is a type of VR image.

Further, an image captured by a camera that can capture subjects existing in a visual field (in an angle-of-view) of 180° in the horizontal direction (horizontal angle, azimuth angle) and in a 180° vertical angle with the horizontal direction at the center, is a type of VR image, for example. In other words, an image that has an image range of which visual field is at least 160° (±80° in the vertical direction and the horizontal direction, respectively, and has an image range wider than a range that human eyes can recognize all at once, is a type of VR image. If this VR image is VR-displayed (displayed in the display mode "VR view"), and the orientation of the display device is changed in the horizontal rotation direction, an omnidirectional image that is seamless in the horizontal direction (horizontal rotation direction) can be viewed. In the case of the vertical direction (vertical rotation direction), an omnidirectional image that is seamless can be viewed in the ±105° range from a position immediately above (zenith), but a range exceeding 105° from the position immediately above becomes a blank region. The VR image may be defined as an image of which image range is in at least a part of a virtual space (VR space).

The VR image (VR view) is a display method (display mode) that can change the display range of the VR image, so that an image in a visual field corresponding to the orientation of the display device is displayed in accordance with the orientation of the display device. In a case of viewing by wearing a head mounted display (HMD) as a display device, an image in a visual field range in accordance with the direction of the face of the user is displayed. For example, it is assumed that an image centered at the viewing angle (angle-of-view) of 0° horizontally (specific direction, such as North) and 90° vertically (90° from the zenith, that is, the horizontal direction) is currently displayed. If the orientation of the display unit is front-back inverted (e.g., direction of display surface is changed from South to North), the display range of the VR image is changed from an image centered at the viewing angle of 180° horizontally (opposite direction, such as South), and 90° vertically (horizontal direction). In the case when the user is viewing wearing a head mounted display (an HMD), if the user turns their face from North to South (that is, if the user turns back), the image displayed on the HMD also changes from the image at the North to the image at the South. By this VR display, the user can visually experience sensations as if they were in the actual location in the VR image (inside the VR space). A smartphone installed in the VR goggles (head mounted adaptor) can be regarded as a type of HMD.

The method for displaying a VR image is not limited to those methods described above, but the display range may be moved (scrolled) in accordance, not with the change of orientation, but with the operation that the user performed on the touch panel, direction button, or the like. During display on the VR display (in VR view mode) as well, the display range may be changed, not only by changing the orientation, but also by the touch-move operation on the touch panel and the drag operation with such an operation member as a mouse.

An image processing unit 24 performs resize processing (e.g., predetermined pixel interpolation, reduction) and color conversion processing on data from the A/D convertor 23a and A/D convertor 23b, or on data from a memory control unit 15. The image processing unit 24 also performs predetermined arithmetic processing using the captured image data. A system control unit 50 performs exposure control and distance measurement control based on the arithmetic operation result acquired by the image processing unit 24. Thereby a through-the-lens (TTL) type auto focus (AF) processing, auto exposure (AE) processing and pre-flash emission (EF) processing are performed. The image processing unit 24 further performs predetermined arithmetic processing using the captured image data, and performs a TTL type auto white balance (AWB) processing based on the acquired arithmetic operation result.

The image processing unit 24 also performs basic image processing on two images (fisheye images) acquired from the A/D convertor 23a and A/D convertor 23b, and then combines (performs image connecting processing) thereon to generate a single VR image. In the image connecting processing performed for the two images, the image processing unit 24 calculates, in each of the two images, the deviation amount between a reference image and a comparative image for each area by pattern matching processing, so as to detect a connecting position. Then, considering the detected connecting positions and each optical system lens characteristic, the image processing unit 24 performs distortion correction for the two images respectively by geometric conversion, and converts the corrected two images into images in omnidirectional image format. By blending these two images in the omnidirectional image format, the image processing unit 24 finally generates one omnidirectional image (VR image). The generated omnidirectional image (VR image) is an image generated by the equidistant cylindrical projection, for example, and a position of each pixel can correspond to coordinates on the surface of the sphere. When the VR image is displayed on the live view or is reproduced, a processing to VR-display the VR image, such as an image extraction processing, magnifying processing and distortion correction, is performed, and rendering to draw the VR image on the VRAM of a memory 32 is also performed.

The output data from the A/D convertor 23 is written to the memory 32 via the image processing unit 24 and the memory control unit 15, or via the memory control unit 15 alone. The memory 32 stores image data, which was acquired by the imaging unit 22 and converted into digital data by the A/D convertor 23, and image data to be outputted to an external display via the connection I/F 25. The memory 32 has a storage capacity that is sufficient for storing a predetermined number of still images, and a predetermined duration of moving images and sounds.

The memory 32 also plays a role of a memory for displaying images (video memory). The data for image display, which has been stored in the memory 32, may be outputted to an external display via the connection I/F 25. The VR images (VR images which were captured by the imaging units 22a and 22b, generated by the image processing unit 24, and stored in the memory 32), are sequentially transferred to the display, and the VR images are displayed thereon. By this process, the live view display (LV display) of the VR images is implemented. Hereafter an image displayed by live view is called an "LV image". The live view display can also be performed by transferring the VR images stored in the memory 32 to an external device (e.g., a smartphone) wirelessly connected via a communication unit 54, and displaying the VR images on the external device side (remote LV display).

A non-volatile memory 56 is an electrically erasable/recordable memory. For the non-volatile memory 56, an EEPROM, for example, is used. In the non-volatile memory 56, constants, programs, and the like, for operation of the system control unit 50, are stored. "Programs" here refers to computer programs for executing processing steps of various flow charts to be described later.

The system control unit 50 is a control unit constituted of at least one processor or circuit, and controls the digital camera 100 in general. The system control unit 50 implements each processing of each embodiment by executing programs recorded in the non-volatile memory 56. A RAM, for example, is used for a system memory 52. In the system memory 52, constants and variables for operating the system control unit 50, programs read from the non-volatile memory 56, and the like, are developed. The system control unit 50 also performs display control by controlling the memory 32, the image processing unit 24 and the memory control unit 15.

The system timer 53 is a timer unit to measure time (time used to execute various controls, and time of an internal clock).

The mode selection switch 60, the shutter button 61, and the operation unit 70 are operation members for inputting various operation instructions to the system control unit 50. The mode selection switch 60 switches the operation mode of the system control unit 50 to a still image recording mode, a moving image capturing mode, a reproduction mode, a communication connection mode, or the like. The still image capturing mode includes an auto image capturing mode, an auto scene determining mode, a manual mode, an aperture priority mode (Av mode), a shutter speed priority mode (TV mode) and a program AE mode. The still image recording mode includes various scene modes to set image capturing for each image capturing scene, and a custom mode. The user can directly switch to one of these modes using the mode selection switch 60. As an alternative, the user may select a list screen in the image capturing mode first using the mode selection switch 60, then select one of the plurality of modes displayed on the display unit 28, and switch to the selected mode using another operation member. In the same manner, the moving image capturing mode may include a plurality of modes.

A first shutter switch 62 turns ON in the middle of operation of the shutter button 61 disposed in the digital camera 100, that is, in the half-depressed state (image capturing preparation instruction), and generates a first shutter switch signal SW1. By the generation of the first shutter switch signal SW1, the system control unit 50 starts an image capturing preparation operation, such as the auto focus (AF) processing, the auto exposure (AE) processing, the auto white balance (AWB) processing, and the pre-flash emission (EF) processing.

A second shutter switch 64 turns ON when operation of the shutter button 61 is completed, that is, in the fully-depressed state (image capturing instruction), and generates a second shutter switch signal SW2. By the generation of the second shutter switch signal SW2, the system control unit 50 starts a series of the image capturing processing operations, from the step of reading signals from the imaging unit 22 to a step of writing the image data to a recording medium 90.

The shutter button 61 is not limited to the shutter button that can be operated in two steps of a full depression and half-depression, but may be an operation member that can perform a one-step depression. In this case, by the one-step depression, the image capturing preparation operation and the image capturing operation are continuously executed. This operation is equivalent to the operation when the shutter button, which can perform the full depression and the half depression, is fully pressed (operation when SW1 and SW2 signals are generated almost at the same time).

Each operation member of the operation unit 70 can function as various function buttons, to which appropriate functions have been assigned depending on the scene, by selecting from various functional icons and choices displayed on the display unit 28. The function buttons are, for example, an end button, return button, forward button, jump button, filter button, and attribute change button. For example, if a menu button is pressed, a menus screen, on which various settings are possible, is displayed on the display unit 28. By operating the operation unit 70 while checking the menu screen displayed on the display unit 28, the user can intuitively perform various settings.

A power supply control unit 80 is constituted of a battery detection circuit, a DC-DC convertor, a switch circuit (circuit to switch a block to be energized), and the like. The power supply control unit 80 detects whether a battery is installed, a type of battery, and a residual amount of the battery. The power supply control unit 80 also controls the DC-DC convertor based on this detection result and instructions from the system control unit 50, and supplies the required voltage to each unit (including the recording medium 90), for a required period of time. A power supply unit 30 is constituted of a primary battery (e.g., an alkali battery, or a lithium battery), a secondary battery (e.g., a NiCd battery, an NiMH battery an, Li battery), an AC adapter, and the like.

A recording medium I/F 18 is an interface with the recording medium 90 (e.g., a memory card, a hard disk). The recording medium 90 is a recording medium to record captured images, such as a memory card. The recording medium 90 is constituted of a semiconductor memory, an optical disk, a magnetic disk, or the like. The recording medium 90 may be an exchangeable recording medium that is detachable from the digital camera 100, or may be an internal recording medium of the digital camera 100.

The communication unit 54 is connected wirelessly or via cable to an external device, and transmits/receives video signals and audio signals. The communication unit 54 is also connectable to a wireless LAN or Internet. The communication unit 54 can send an image (including LV image) captured by the imaging unit 22a or the imaging unit 22b, and an image recorded in the recording medium 90. The communication unit 54 can also receive images and various other information from the external device.

An orientation detection unit 55 detects an orientation of a digital camera 100 with respect to the gravity direction. Based on the orientation detected by the orientation detection unit 55, it can be determined whether the image captured by the imaging unit 22 is an image, captured by the digital camera 100, that is held horizontally, or an image captured by the digital camera 100 which is held vertically. Further, it can be determined how much the imaging unit 22 was inclined in the three axis directions (yaw, pitch, roll) when the image was captured by the imaging unit 22. The system control unit 50 can attach the orientation information in accordance with the orientation detected by the orientation detection unit 55 to an image file of a VR image captured by the imaging units 22a and 22b. The system control unit 50 can also record an image in the rotated state in accordance with the detected orientation (with adjusting the direction of the image so as to correct inclination). For the orientation detection unit 55, at least one or a combination of an acceleration sensor, a gyro-sensor, a geo-magnetic sensor, an azimuth sensor, an altitude sensor, and the like, may be used. Using the orientation detection unit 55 (acceleration sensor, gyro-sensor, azimuth sensor), a movement of the digital camera 100 (e.g. pan, tilt, lift up, remain still) can be detected.

A microphone 20 is a microphone to collect the sounds around the digital camera 100 to be recorded as sounds of the moving image of the VR image. The connection I/F 25 is a connection plug with an HDMI® cable, a USB cable, or the like, so that images are transmitted or received to/from a connected external device.

Figure 2A:
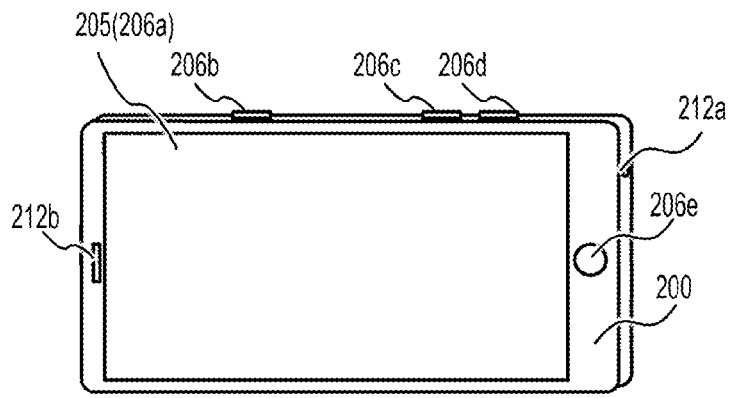
FIGS. 2A and 2B are diagrams depicting a display control device.

FIG. 2A indicates an example of an external view of a display control device 200, which is a type of electronic device. A display 205 is a display unit to display images and various information. As mentioned later, the display 205 is integrated with a touch panel 206a. Thereby the display control device 200 can detect a touch operation to a display surface of the display 205. The display control device 200 can display and reproduce a VR image (VR content) in the VR format on the display 205.

The operation unit 206 includes the touch panel 206a, and operation units 206b, 206c, 206d and 206e. The operation unit 206b is a power supply button that accepts operation to switch the power supply of the display control device 200 ON/OFF. The operation unit 206c and the operation unit 206d are volume buttons to increase/decrease the volume of the sounds outputted from a sound output unit 212. The operation unit 206e is a home button to display a home screen on the display 205. A sound output terminal 212a is an earphone jack, and is a terminal to output sounds to an earphone, an external speaker, or the like. A speaker 212b is an internal speaker of the main unit to output sounds.

Figure 2B:
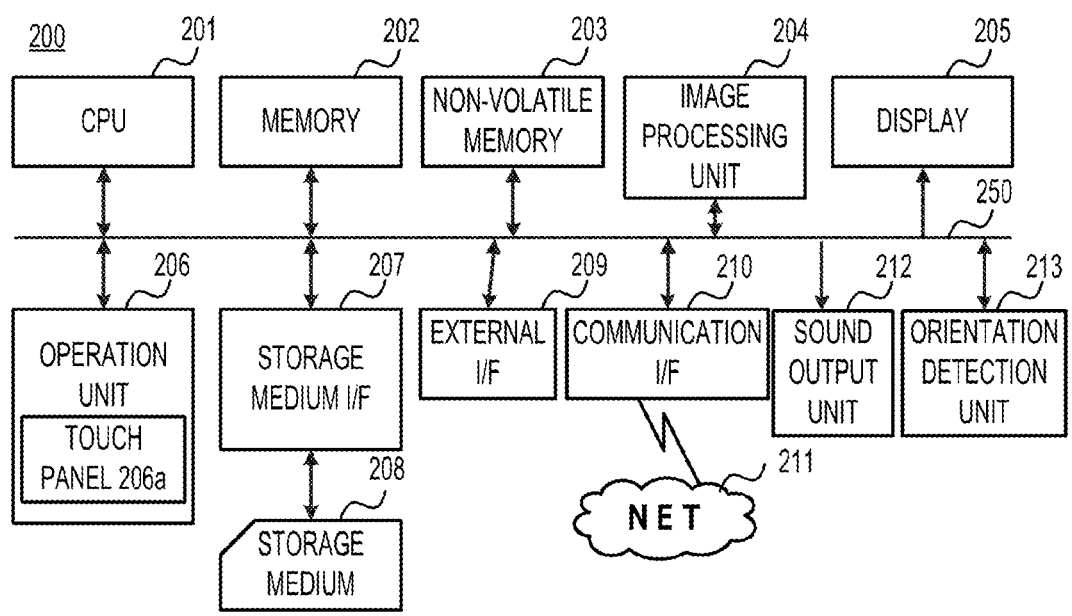

FIG. 2B indicates an example of a configuration of the display control device 200. The display control device 200 can be configured using such a display device of a smartphone, or the like. To an internal bus 250, a CPU 201, a memory 202, a non-volatile memory 203, an image processing unit 204, the display 205, an operation unit 206, a storage medium I/F 207, an external I/F 209, and a communication I/F 210 are connected. Further, the sound output unit 212 is an orientation detection unit 213 are also connected to the internal bus 250. Each unit connected to the internal bus 250 can exchange data with each other via the internal bus 250.

A CPU 201 is a control unit that controls the display control device 200 in general, and is constituted of at least one processor or circuit. The memory 202 is constituted of a RAM (e.g., a volatile memory using a semiconductor element), for example. The CPU 201 controls each unit of the display control device 200 using the memory 202 as a work memory, in accordance with a program stored in the non-volatile memory 203, for example. In the non-volatile memory 203, image data, audio data, other data, various programs for the CPU 201 to operate, and the like, are stored. The non-volatile memory 203 is constituted of a flash memory, ROM, or the like, for example.

Based on the control of the CPU 201, the image processing unit 204 performs various types of image processing on images (e.g., images stored in the non-volatile memory 203 and storage medium 208, video signals acquired via the external I/F 209, images acquired via the communication I/F 210). The image processing performed by the image processing unit 204 includes A/D conversion processing, D/A conversion processing, encoding processing for image data, compression processing, decoding processing, magnifying/demagnifying processing (resizing), noise reduction processing, and color conversion processing. The image processing unit 204 also performs various other types of image processing, such as panoramic development, mapping processing and conversion of a VR image, which is a wide range image (including but not limited to an omnidirectional image) having data in a wide range. The image processing unit 204 may be configured by a dedicated circuit block to perform specific image processing. Depending on the type of image processing, the CPU 201 may perform the image processing in accordance with a program without using the image processing unit 204.

The display 205 displays images, graphical user interface (GUI) screens that configure a GUI, and the like, based on the control of the CPU 201. The CPU 201 generates display control signals in accordance with a program, and controls each unit of the display control device 200 (controls such that video signals to display images on the display 205 are generated and outputted to the display 205). The display 205 displays images based on the video signals. The configuration provided by the display control device 200 itself may be only the units up to the interface to output video signals to display the images on the display 205, and the display 205 may be configured by an externally connected monitor (e.g., a TV).

The operation unit 206 is an input device to accept a user operation. The operation unit 206 includes a text information input device (e.g., a keyboard), a pointing device (e.g., a mouse, touch panel), buttons, a dial, a joystick, a touch sensor, and a touch pad. The touch panel is a flat input device which is superimposed on the display 205, and from which coordinate information in accordance with the touch position is outputted.

The storage medium I/F 207 can have a storage medium 208 (a memory card, a CD, a DVD) installed. Based on the control of the CPU 201, the storage medium I/F 207 reads data from the installed storage medium 208, or writes data to the storage medium 208. The external I/F 209 is an interface to connect with an external device wirelessly or via a cable, and input/output video signals and audio signals. The communication I/F 210 is an interface to communicate with an external device, a network 211, or the like, and sends/receives various data, such as files and commands.

The sound output unit 212 outputs sounds of moving images and music data, operation tones, ringtones, and various notification tones. The sound output unit 212 includes the sound output terminal 212a (terminal to connect an earphone, or the like), and the speaker 212b. The sound output unit 212 may output sounds via wireless communication.

An orientation detection unit 213 detects an orientation of the display control device 200 with respect to the gravity direction, and the inclination of the orientation from each axis of yaw, roll and pitch. Based on the orientation detected by the orientation detection unit 213, it can be detected whether the display control device 200 is held horizontally, is held vertically, is turned upward, is turned downward, is in the diagonal orientation, or the like. For the orientation detection unit 213, at least one of an acceleration sensor, a gyro-sensor, a geo-magnetic sensor, an azimuth sensor, an altitude sensor, and the like, can be used, or a combination of a plurality of such sensors may be used.

The operation unit 206 includes the touch panel 206a. The CPU 201 can detect the following operations on the touch panel 206a, or states thereof:

a finger or a pen, which does not touch the touch panel 206a, newly touches the touch panel 206a, that is, the start of touch (hereafter Touch-Down);

a finger or a pen is touching the touch panel 206a (hereafter Touch-On);

a finger or a pen is moving on the touch panel 206a in the touched state (hereafter Touch-Move);

a finger or a pen touching the touch panel 206a is released from the touch panel 206a, that is, the end of touch (hereafter Touch-Up); and Nothing is touching the touch panel 206a (hereafter Touch-Off)

When Touch-Down is detected, Touch-On is detected at the same time. Unless Touch-Up is detected after Touch-Down, normally Touch-On is continuously detected. In the case when Touch-Move is detected as well, Touch-On is detected at the same time. Even if Touch-On is detected, Touch-Move is not detected unless the touch position is moving. When Touch-Up of a finger or a pen is detected and nothing is touching the touch panel 206a, Touch-Off is detected.

These operations/states and coordinates of the positions on the touch panel 206a, where a finger or a pen is touching, are notified to the CPU 201 via the internal bus. Based on the notified information, the CPU 201 determines which operation (touch operation) was performed on the touch panel 206a. For Touch-Move, the moving direction of the finger or the pen moving on the touch panel 206a can also be determined for the vertical component and the horizontal component on the touch panel 206a, respectively, based on the change of the positional coordinates. In the case when Touch-Move for at least a predetermined distance is determined, it is determined that the slide operation was performed. An operation of quickly moving a finger for a certain distance while touching the touch panel 206a and releasing the finger is called a "flick". In other words, flick is an operation of a sudden quick movement (flicking) of the finger on the touch panel 206a. In a case when Touch-Move for at least a predetermined distance at a predetermined speed or faster is detected, and Touch-Up is detected immediately thereafter, it is determined that flick was performed (it is determined that flick occurred after the slide operation).

Further, a touch operation of touching a plurality of locations (e.g., two points) simultaneously and moving these touch positions close to each other is called a "Pinch-In", and the touch operation of moving these touch positions away from each other is called a "Pinch-Out". Pinch-In and Pinch-Out are collectively called a "pinch operation" (or simply "pinch"). For the touch panel 206a, any one of the various types of touch panels may be used, such as a resistive film type, an electrostatic capacitive type, a surface acoustic wave type, an infrared type, an electromagnetic induction type, an image recognition type, and a photosensor type. Some types detect touch when the touch panel is actually contacted, while others detect touch when a finger or a pen approaches the touch panel, but either type can be used.

The storage medium 208 stores data, such as images to be displayed on the display 205. The CPU 201 records/reads data to/from the storage medium 208 via the storage medium I/F 207.

The external I/F 209 is an interface to perform data communication with an external device by allowing a USB cable, or the like to be inserted into the display control device 200. The communication I/F 210 is an interface to perform data communication with the external network 211 via wireless communication.

The sound output unit 212 outputs the sound of the content reproduced in the display control device 200, for example. The orientation detection unit 213 detects the orientation of the display control device 200, and notifies the orientation information to the CPU 201.

Now, display control processing for setting an extraction reference position (viewing point position) to extract (select) a part of an image at an angle-of-view of the VR content, which the digital camera 100 acquired by image capturing, will be described with reference to FIGS. 3A to 3C and FIG. 4. Here, the VR content may be an omnidirectional image or an omnidirectional panoramic image. The VR content may be an image captured by a camera that can capture a subject in a visual field range (angle-of-view) of 180° or less in the horizontal direction (horizontal angle, azimuth angle), and of 180° or less in the vertical direction with the horizontal direction at the center. The VR content may be a still image or a moving image, as long as an image (frame image) corresponds to each reproduction time (frame). In the following description, it is assumed that the VR content is moving image content which includes a plurality of frame images. Each frame image corresponds to the reproduction time in the reproduction period (reproduction duration) of the VR content. The VR content is reproduced by sequentially displaying a plurality of frame images on the screen in accordance with the reproduction time.

Figure 3B:
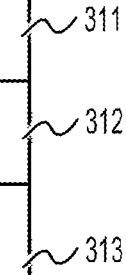
Figure 3C:
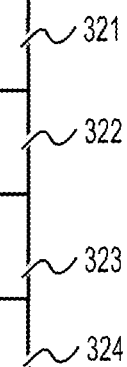

The data on the extraction reference position associated with each frame (each reproduction time) of the VR content has been stored in position setting data. The position setting data is data in a table format, for example, as indicated in FIG. 3C. The position setting data is stored in the memory 202. In the position setting data, even in a case where the user does not specify the extraction reference position, a predetermined initial value (e.g., center position of the VR content) is associated with each frame as the extraction reference position.

Display Control Screen

FIG. 3A is a display control screen 300 that is displayed on the display 205 of the display control device 200 to perform the display control processing.

The display control screen 300 includes a reproduction display area 301 and a time line area 302. The reproduction display area 301 displays an angle-of-view region that is generated by extracting (selecting) a range (a part of a frame image) centering around the extraction reference position from the frame image of the VR content currently being reproduced (one frame image at the current reproduction time). The time line area 302 corresponds to the reproduction period of the VR content, and indicates a temporal change (change in accordance with the elapse of the reproduction time) of the VR content in at least a part of the reproduction period.

In the reproduction display area 301, a frame image corresponding to the reproduction time of the VR content is displayed, and, if the extraction reference position specified by the user (the extraction reference position specified by the user is hereafter called a "specified position") has been set for this frame image (frame), a pointer 303 is also displayed at this specified position. Instead of setting one specified position in one frame (frame image), the user may set one common specified position for one period (block) constituted of a plurality of continuous frame images. In a period for which one specified position is set (called a "specified period"), the extraction reference position, associated with all the frame included in this specified period, is fixed to the specified position.

Here, the pointer 303 is displayed at the center position of the extracted image (angle-of-view region) in Embodiment 1, but may be displayed at the coordinates of a plurality of positions, such as two opposite corners of the angle-of-view region. The pointer 303 may be an arbitrary display item, as long as the item can indicate in the reproduction display area 301 that the frame currenting being reproduced is included in the specified period.

In the time line area 302, one frame (reproduction time) is selected from the VR content for every predetermined number of frames (predetermined period), for example, and these images of the plurality of selected frames (frame images) are displayed in order of the frames (in order of reproduction times). By disposing the images of the plurality of frames like this, the temporal change of the VR content in at least a part of the reproduction period can be expressed. In the time line area 302, for an image of the selected frame, only the angle-of-view region centering around the extraction reference position associated with this frame is displayed. In the time line area 302, an image of a later frame is displayed as the display position is closer to the right. In other words, in the time line area 302, the period of the reproduction time is later as the display position is closer to the right.

In a case when a period (specified period), in which maintaining the extraction reference position is set, exists in the time line area 302, the specified period is displayed such that this period can be separated from a period in which maintaining the extraction reference position is not set (called a "non-specified period"). In Embodiment 1, the display control device 200 fills the specified period 304 such that the frame image corresponding to the specified period 304 appears transparent, as indicated in FIG. 3A, but may highlight the specified period 304 by a different method. The display control device 200 may highlight the non-specified period, instead of the specified period 304.

Further, on the display control screen 300, the display control device 200 may display an addition button 305 to set a specified position to the frame (reproduction frame) that is being displayed and reproduced in the reproduction display area 301. In the case when the specified position is set in the reproduction frame in the reproduction display area 301 on the display control screen 300, the display control device 200 may display a copy button 306 to reflect this specified position in other frames. For example, the specified period is set in the time line area 302 in accordance with the user operation, and, by touching the copy button 306, the specified position is copied and set for a plurality of frames (frame images) included in the specified period 304.

Here, it is assumed that the specified position is set for a frame (reproduction frame) that is being displayed and reproduced in the reproduction display area 301, in accordance with the user operation, and a different specified position is set for a different reproduction frame. In this case, for a plurality of frames (frame images) existing between these two frames, the positions thereof on the track connecting the specified positions of these two frames (frame images) are calculated for each frame, and are automatically set.

The display control device 200 may also display on the display control screen 300 a generation button 307 for generating a moving image by extracting the angle-of-view region of each frame from the VR content. By touching various buttons (add button 305, copy button 306, generation button 307) displayed on the display 205, the user can send instructions corresponding to various buttons to the display control device 200. Further, after the plurality of specified periods are selected, the display control device 200 (CPU 201) may control the durations of the plurality of selected specified periods to be the same length when a specific button is pressed. Furthermore, after the plurality of specified periods are selected, the CPU 201 may control the specified positions associated with the plurality of selected specified periods to be the same position when a specific button is pressed.

Further, the range of the specified period 304 may be changeable in accordance with the pinch operation (Pinch-Out or Pinch-In) performed on the specified period 304 displayed in the time line area 302, for example. Furthermore, the specified position associated with the frame of the frame image that is being displayed in the reproduction display area 301 may be changeable in accordance with the Touch-Move performed with the pointer 303. In this case, when the specified position associated with this frame is changed, the CPU 201 changes the specified positions in the same way for all the frames in the specified period to which this frame belongs.

Figure 4:
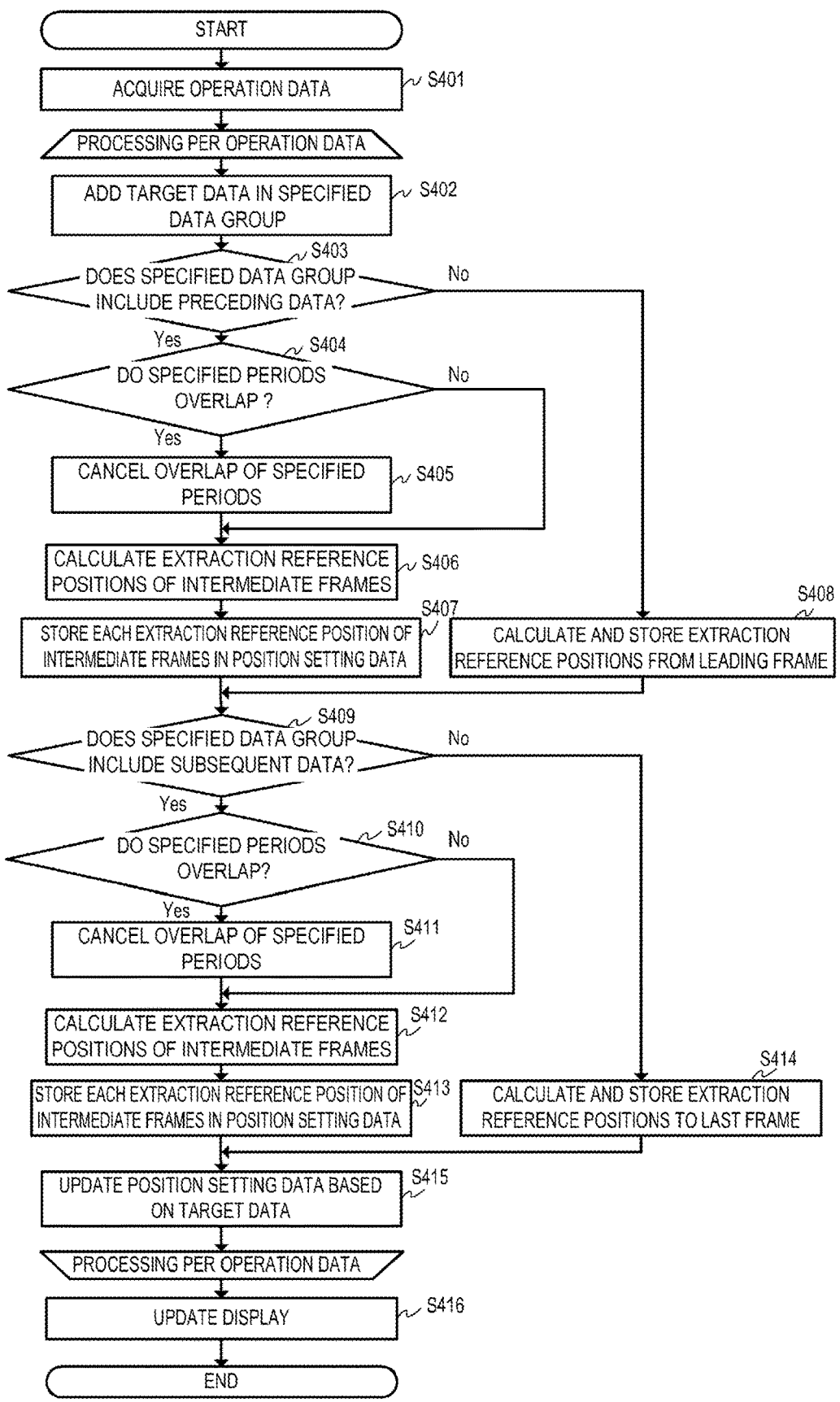
FIG. 4 is a flow chart of display control processing.

Display Control Processing FIG. 4 is a flow chart indicating the display control processing. The processing of this flow chart starts when it is determined that a predetermined operation is performed on the operation unit 206. The predetermined operation here may be an operation of pressing the addition button 305 to set a new specified position. The predetermined operation may also be an operation to press the copy button 306 to set information on a specified position, that is set for a certain period (frame), to another period (frame). The predetermined operation may also be a pinch operation performed in the specified period 304 that is displayed on the time line area 302, or Touch-Move that is performed on the pointer 303.

The processing of this flow chart is implemented by the CPU 201 executing a program stored in the non-volatile memory 203.

In the following, it is assumed that the VR content are moving images having 100 frames of reproduction period (frames f1 to f100). In other words, the start point frame of the VR content is frame f1, and the end point frame of the VR content is frame f100.

In step S401, the CPU 201 acquires data (operation data) in accordance with the user operation. Here, the operation data includes data on the specified period (period in which the extraction reference position is maintained), and data on the specified position associated with this specified period. The leading frame (first frame) in the specified period is called a "start point frame", and the last frame in the specified period is called an "end point frame". The data of the specified period may be data on the two frames of the start point frame and the end point frame, since the range of the specified period can be recognized thereby.

For example, if the user executes Touch-Move on the pointer 303 and changes the specified position in the reproduction frame (the frame image currently in the reproduction display area 301), the CPU 201 acquires data on the updated specified position. Then, when the user touches the copy button 306 in the time line area, the data on the specified period from the start point frame to the end point frame, which corresponds to this frame image, is acquired.

In step S401, a plurality of operation data may be acquired. For example, in the case when an operation to change the specified positions and specified periods associated with the VR content in batch (e.g., an operation to set the specified positions associated with the plurality of specified periods to the same position) is executed, the CPU 201 acquires a plurality of operation data.

Hereafter, in steps S402 to S415, the CPU 201 repeats the processing independently for each of the operation data acquired in step S401. The operation data to be processed here is hereafter called "target data". The target data is an operation data having the specified period of the "start point frame ft to end point frame ft'".

In step S402, the CPU 201 stores the target data in a specified data group. As indicated in FIG. 3B, the specified data group here may include one or a plurality of specified data (e.g., specified data 311 to 313 in the case of FIG. 3B). Each of one or plurality of specified data includes data on the specified positions and data on the specified period in which the extraction reference position is maintained at the specified position. Since the specified position and the specified period are associated with each other and stored as the specified data in the specified data group, it is set for this data such that the extraction reference position is maintained (fixed) during this specified period. The specified data group may be data in a data table format (specified data table), as indicated in FIG. 3B, or may be data in an array format (specified data array).

In step S403, the CPU 201 determines whether the specified data group includes preceding data. "Preceding data" here refers to the specified data of which start point frame is a frame before the start point frame ft of the target data. For example, if the start point frame ft of the target data is frame f14, the specified data group indicated in FIG. 3B includes the specified data 311 (specified data including the start point frame f10, which is before the start point frame ft) as the preceding data. Processing advances to step S404 if it is determined that the specified data group includes the preceding data. Processing advances to step S408 if it is determined that the specified data group does not include the preceding data.

In step S404, the CPU 201 determines whether any of the specified periods of the preceding data included in the specified data group overlap with the specified period of the target data. Here, "two specified periods overlap" refers to the state when the two specified periods share at least one same frame. For example, the specified period of the frames f5 to f10 and the specified period of the frames f10 to f15 share the frame f10. Hence, these specified periods overlap. If the specified period of the target data is frames f14 to f18 and the preceding data is the specified data 311 (specified data of which specified period is f10 to f15), these two specified periods overlap. Processing advances to step S405 if it is determined that any of the specified periods of the preceding data overlap with the specified period of the target data. Processing advances to step S406 if it is determined that none of the specified periods of the preceding data overlap with the specified period of the target data.

Processing may advance to S405 not only in the case when any of the specified periods of the preceding data overlap with the specified period of the target data, but also in the case when any of the specified periods of the preceding data and the specified period of the target data are continuous. For example, the specified period of the frames f5 to and the specified period of the frames f10 to f15 are continuous, since no other frames exist between these two specified periods.

In step S405, the CPU 201 shifts the start point frame ft of the target data backward by the amount of a predetermined number of frames, in order to cancel the overlap (or the continuation) of the specified period of the target data and the specified period of the preceding data. For example, in the case when the frames f14 to f20, which is the specified period of the target data, overlap with the frames f10 to f15, which is the specified period of the preceding data (specified data 311), the CPU 201 shifts the start point frame ft of the target data backward by three frames. In other words, the CPU 201 changes the start point frame ft of the target data to frame f17. Here, the CPU 201 updates the specified data (specified data corresponding to the target data) stored in the specified data group in accordance with the target data of which start point frame (specified period) was changed.

As an alternative, the CPU 201 may shift the end point frame of the specified period of the preceding data ("overlapped preceding data"), which overlaps (or is continuous) with the specified period of the target data, forward by an amount of a predetermined number of frames. The overlapped preceding data is stored in the specified data group. Hence, the specified period (end point frame) of the overlapped preceding data in the specified data group is updated.

Here, the target of change (which of the start point frame ft of the target data or the end point frame of the overlapped preceding data is to be changed) and the predetermined number of frames may be determined in advance, or may be set by operation. The CPU 201 may shift the start point frame ft of the target data or the end point frame of the overlapped preceding data until the overlap (or continuation) of the specified period of the target data and the specified period of the preceding data is cancelled. In Embodiment 1, the CPU 201 changes either one of the two specified periods, but both of these two periods may be changed, or neither may be changed. Further, the CPU 201 may control operation such that the user cannot set operation data (target data) that overlaps (or is continuous) with any specified data in the specified data group.

In step S406, the CPU 201 calculates (determines) the extraction reference positions of frames ("intermediate frames") between the end point frame of the overlapped preceding data and the start point frame ft of the target data. Here, the CPU 201 calculates the extraction reference positions of the intermediate frames such that the extraction reference position moves on a track connecting the specified position of the overlapped preceding data and the specified position of the target data at a constant speed, from the end point frame of the overlapped preceding data to the start point frame ft (along with the elapse of the reproduction time), for example. As an alternative, the CPU 201 may calculate the extraction reference positions of the intermediate frames such that the extraction reference position moves on a track connecting the specified position of the overlapped preceding data and the specified position of the target data at a constant speed, from the start point frame of the intermediate frames to the end point frame of the intermediate frames (along with the elapse of the reproduction time). This moving speed of the extraction reference position is not limited to the constant speed but may be arbitrarily set by the user.

In step S407, the CPU 201 stores each extraction reference position of the intermediate frames calculated in step S406 in the position setting data. In other words, the CPU 201 updates each extraction reference position of the intermediate frames in the position setting data to each extraction reference position calculated in step S406.

In step S408, the CPU 201 calculates (determines) the extraction reference position of each frame from the start from the start point frame f1 to the frame ft-1 (previous frame of the start point frame ft of the target data) of the VR content. Here, the extraction reference position of each frame may be set to the specified position of the target data, or may be the extraction reference position of the frame f1 stored in the position setting data in advance. The CPU 201 may calculate each extraction reference position of the frames f1 to ft-1, respectively, such that the extraction reference position moves from the extraction reference position of the frame f1 stored in the position setting data to the specified position of the target data at a constant speed, from the frame f1 to ft. Then, the CPU 201 updates each extraction reference position of the frames f1 to ft-1 in the position setting data to the calculated extraction reference position respectively.

In step S409, the CPU 201 determines whether the specified data group includes the subsequent data. "Subsequent data" here refers to the specified data of which end point frame is a frame after the end point frame of the target data. For example, if the end point frame ft' of the target data is frame f30, the specified data group indicated in FIG. 3B includes the specified data 313 (specified data including the end point frame f33, which is before the end point frame ft) as the subsequent data. Processing advances to step S410 if it is determined that the specified data group includes the subsequent data. Processing advances to S414 if it is determined that the specified data group does not include the subsequent data.

In step S410, the CPU 201 determines whether any of the specified periods of the subsequent data included in the specified data group overlap with the specified period of the target data. Processing advances to step S411 if it is determined that any of the specified periods of the subsequent data overlap with the specified period of the target data. Processing advances to step S412 if it is determined that none of the specified periods of the subsequent data overlap with the specified period of the target data.

Processing may advance to S411 not only in the case when any of the specified periods of the subsequent data overlap with the specified period of the target data, but also in the case when any of the specified periods of the subsequent data and the specified period of the target data are continuous.

In step S411, the CPU 201 shifts the end point frame ft' of the target data forward by the amount of a predetermined number of frames, in order to cancel the overlap (continuation) of the specified period of the target data and the specified period of the subsequent data. Here, the CPU 201 updates the specified data (specified data corresponding to the target data) stored in the specified data group in accordance with the target data of which end point frame ft' (specified period) was changed.

As an alternative, the CPU 201 may shift the start point frame of the specified period of the subsequent data ("overlapped subsequent data"), which overlaps with the specified period of the target data backward by an amount of a predetermined number of frames. The overlapped subsequent data is stored in the specified data group. Hence, the specified period (start point frame) of the overlapped subsequent data in the specified data group is updated.

Here, the target of change (which of the end point frame ft' of the target data or the start point frame of the overlapped subsequent data is to be changed) and the predetermined number of frames may be determined in advance, or may be set by operation. In Embodiment 1, the CPU 201 changes either one of the two specified periods, but both of these two periods may be changed, or neither may be changed. Further, the CPU 201 may control operation such that the user cannot set operation data (target data) that overlaps (or is continuous) with any specified data in the specified data group.

In step S412, the CPU 201 calculates the extraction reference positions of frames (intermediate frames) between the start point frame of the overlapped subsequent data and the end point frame ft' of the target data. Here, the CPU 201 calculates the extraction reference position of the intermediate frames such that the extraction reference position moves on a track connecting the specified position of the target data and the specified position of the overlapped subsequent data at a constant speed, from the end point frame ft' to the start point frame of the overlapped subsequent data. As an alternative, the CPU 201 may calculate the extraction reference position of the intermediate frames such that the extraction reference position moves on a track connecting the specified position of the target data and the specified position of the overlapped subsequent data at a constant speed, from the start point of the intermediate frames to the end point frame of the intermediate frames (along with the elapse of the reproduction time). This moving speed of the extraction reference position may be arbitrarily set by the user.

In step S413, the CPU 201 stores each extraction reference position of the intermediate frames calculated in step S412 in the position setting data. In other words, the CPU 201 updates each extraction reference position of the intermediate frames in the position setting data to each extraction reference position calculated in step S412.

In step S414, the CPU 201 calculates the extraction reference position of each frame from the frame ft'+1 (subsequent frame of the end point frame ft' of the target data) to the end frame f100 of the VR content. Here, the extraction reference position of each frame may be the specified position of the target data, or the extraction reference position of the frame f100 stored in the position setting data in advance. The CPU 201 may calculate each extraction reference position of each of the frames ft'+1 to f100, such that the extraction reference position moves on a track connecting the specified position of the target data to the extraction reference position of the frame f100 stored in advance at constant speed, from the end point frame ft' to the frame f100. Then, the CPU 201 updates each extraction position of the frames ft'+1 to f100 in the position setting data to the calculated extraction reference position.

In step S415, the CPU 201 updates the extraction reference position of each frame, from the start point frame ft to the end point frame ft' in the position setting data, to the specified position of the target data. For example, it is assumed that the specified period of the target data is frames f14 to f18, and the specified position of the target data is the coordinates (200, 200). In this case, the CPU 201 updates the extraction reference position associated with the frames f14 to f18 in the position setting data to the coordinates (200, 200).

When the processing in step S415 ends for the target data here, the CPU 201 sets any one of the remaining operation data for which the processing in steps S402 to S415 has not been executed as new target data if there remains such operation data. Then, the CPU 201 executes the processing in steps S402 to S415 for this new target data. Thereby, the CPU 201 can execute the processing in steps S402 to S415 for all the acquired operation data.

In step S416, based on the specified data group and the position setting data, the CPU 201 updates the display of the reproduction display area 301 and the pointer 303 on the display control screen 300, which is displayed on the display 205. For example, the CPU 201 acquires the extraction reference position of the reproduction frame from the position setting data, and displays an angle-of-view region corresponding to the extraction reference position, out of the VR content, on the reproduction display area 301. The CPU 201 may perform the zenith correction on the frame image of each reproduction frame included in the specified period first, then display the reproduction images. Thereby, even if the orientation of the imaging apparatus changes during capturing the VR content, particularly, during the image capturing corresponding to the specified period, the same positional angle-of-view region can be reproduced and displayed on the celestial sphere. In the case when the specified period exists in the VR content, the zenith correction may be performed on the frame images of all the reproduction frames included in the VR content, and not be performed if the specified period does not exist. In any case, it is preferable that the zenith correction is performed on the frame image of each reproduction frame included in the specified period.

The CPU 201 displays the pointer 303 in the case when a reproduction frame is included in a specified period in any one of the specified data of the specified data group. The CPU 201 does not display the pointer 303 in the case when no reproduction frame is included in a specified period in any of the specified data of the specified data group. The CPU 201 updates the display of the specified period in the time line area 302 based on the specified data group.

Moving Image Generation Processing

Now, moving image generation processing, to generate a moving image extracted (selected) at a part of an angle-of-view from VR content in which a specified period is set, will be described based on the flow chart in FIG. 4, with reference to FIG. 5. FIG. 5 is a flow chart of the moving image generation processing.

The processing in the flow chart in FIG. 5 starts when it is determined that the generation button 307 is pressed (a generation of the moving image extracted at a part of the angle-of-view region from the VR content is requested). The processing of this flow chart is implemented by the CPU 201 executing a program stored in the non-volatile memory 203.

Here, for a number of frames of the VR content, the CPU 201 repeats execution of the processing in steps S501 and S502, from the start frame f1, for one frame at a time. In other words, for each of the start point frame f1 to the end frame f100, the CPU 201 independently executes the processing in steps S501 and S502. In the following, the frame to be processed in steps S501 and S502 is called a "target frame".

In step S501, the CPU 201 acquires data on the extraction reference position of the target frame from the position setting data.

In step S502, based on the data on the extraction reference position acquired in step S502, the CPU 201 extracts (selects) a part of an angle-of-view region from the target frame (frame image of the target frame) of the VR content. The CPU 201 stores the extracted angle-of-view region in the memory 202 as the extracted image.

When the processing in steps S501 and S502 ends, the CPU 201 performs the processing in steps S501 and S502 for the frame next to the target frame, as a new target frame, unless the target frame is the final frame. If the target frame is the final frame, the CPU 201 performs the processing in step S503.

In step S503, the CPU 201 acquires an extracted image of each frame of the VR content from the memory 202. Then, the CPU 201 generates a moving image by connecting all the acquired extracted images in order of frames (in order of reproduction times).

Speed Control Processing

As described above, in the case when the specified position is not set in a period (non-specified period) in steps S406 and S412 of the display control processing in FIG. 4, the CPU 201 calculates the extraction reference position for this period based on the specified positions in the specified periods before and after the non-specified period. Further, in the non-specified period, the extraction reference position may be calculated, such that the extraction reference position moves from a certain position (coordinates) to another position along with the elapse of the reproduction time. In the following, the speed control processing, to control the speed of the extraction reference position moving in the non-specified period, will be described with reference to FIGS. 6A to 6D and FIG. 7.

Figure 6A:
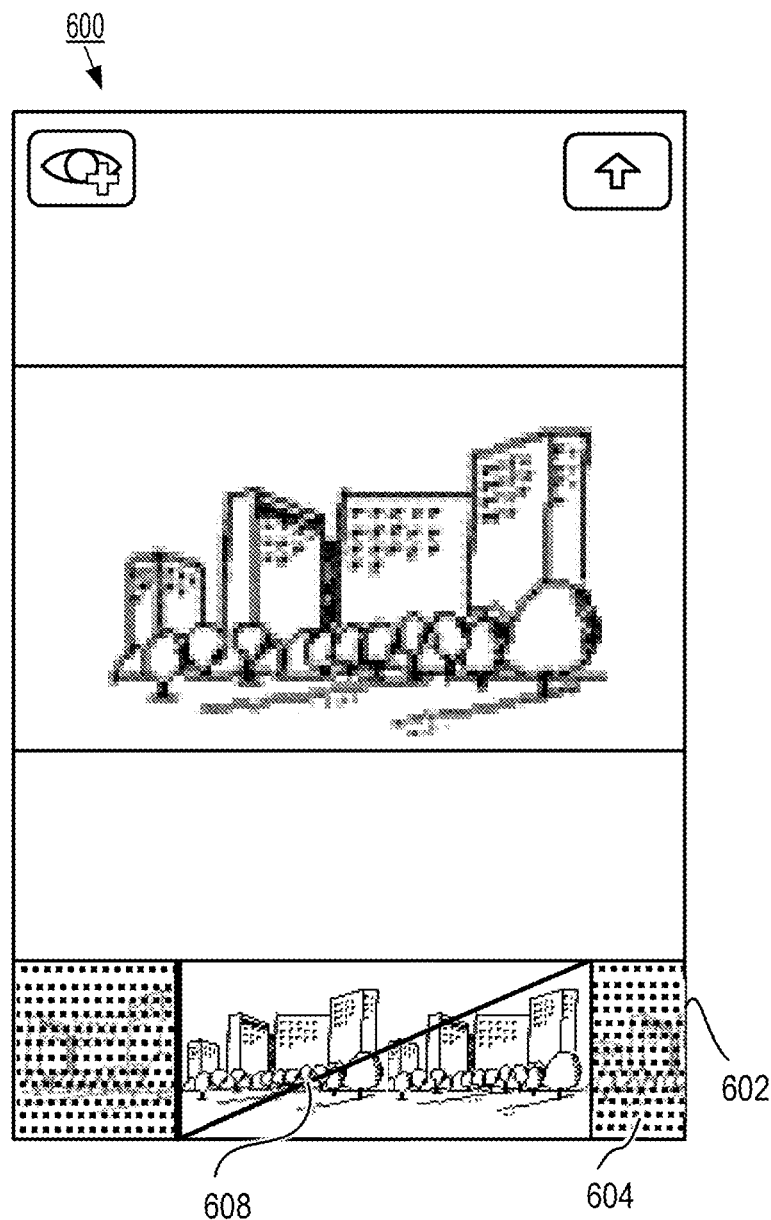
FIGS. 6A to 6D are diagrams for describing speed control processing.

FIG. 6A indicates a display control screen 600 that is displayed 205 on the display in order to perform the speed control processing. The display control screen 600 in FIG. 6A has essentially the same display configuration as the display control screen 300 illustrated in FIG. 3A. Therefore, only the display configuration that is noteworthy in the speed control processing will be described below.

On the display control screen 600, a time line area 602, to display the temporal change (change along with the elapse of the reproduction time) of the VR content, is displayed. In the time line area 602, the specified period 604, in which the specified position (maintaining of the specified position) is set, is highlighted. Here, a non-specified period may be highlighted instead of the specified period 604.

Figure 6B:
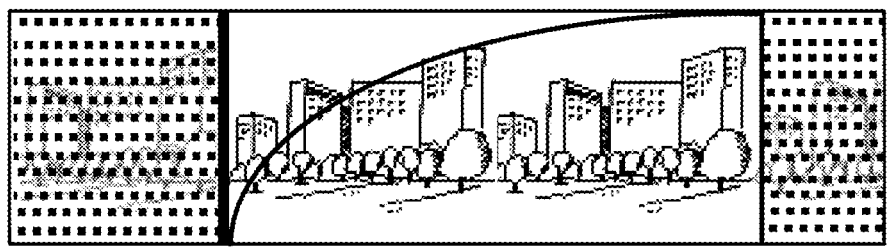
Figure 6C:
Figure 6D:
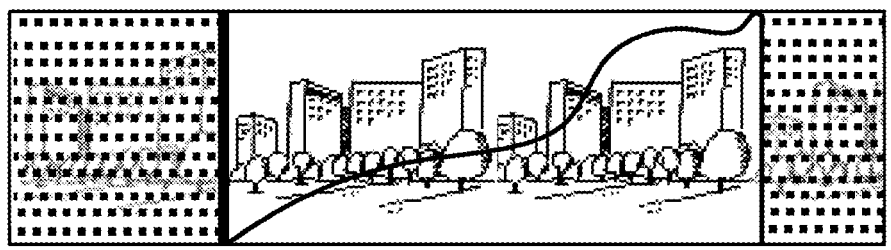

In the time line area 602, a moving speed graph 608 (a graph indicating the moving speed of the extraction reference position in the non-specified period) is displayed, so as to be superimposed on the non-specified period. In the case when the moving speed of the extraction reference position in the non-specified period is a constant speed, the moving speed graph 608 is expressed by a diagonal line in the non-specified period, as indicated in FIG. 6A. In the case when the moving speed of the extraction reference position in the non-specified period is not a constant speed, the moving speed graph 608 is a moving speed graph expressed by a curve, as indicated in FIGS. 6B to 6D. Instead of the moving speed graph, a different display method to express the moving speed of the extraction reference position in the non-specified period may be used. The moving speed graph 608 may be displayed on all the non-specified periods displayed in the time line area 602, or may be displayed on only the specified non-specified period selected by the user.

FIG. 7 is a flow chart of the speed control processing, to control the moving speed of the extraction reference position based on the moving speed graph. The speed control processing starts when it is determined that an operation to select one moving speed graph is performed. The operation to select one moving speed graph may be a touch on a moving speed graph or pressing a specified button to select a moving speed graph. The processing of this flow chart is implemented by the CPU 201 executing a program stored in the non-volatile memory 203.

In step S701, the CPU 201 acquires the data on the selected moving speed graph, and data on the non-specified period on which this moving speed graph is superimposed.

In step S702, the CPU 201 calculates the extraction reference position in each frame of the non-specified period, based on the shape of the moving speed graph and the non-specified period. For example, in a case when a moving speed graph having the shape indicated in FIG. 6A is acquired, the CPU 201 determines the extraction reference position of each frame such that the moving speed of the extraction reference position in the non-specified period becomes a constant speed.

Further, in a case when the moving speed graphs having the shapes indicated in FIGS. 6B to 6D are acquired, the CPU 201 sets the moving speed of the execution reference position to a fast speed in the non-specified period in accordance with the inclination of the moving speed graph in a period where the inclination is major. On the contrary, the CPU 201 sets the moving speed of the extraction reference position to a slower speed in accordance with the inclination of the moving speed graph in a period where the inclination is minor. Then, the CPU 201 determines the extraction reference position of each frame by adjusting the moving speed of the extraction reference position so as not to exceed a number of frames in the non-specified period.

For example, the moving speed graph displayed in FIG. 6B indicates that the moving speed of the extraction reference position is fastest in the leading frame (first frame) of the non-specified period, and the moving speed sequentially decreases in the frames thereafter. The moving speed graph displayed in FIG. 6C, on the other hand, indicates that the moving speed of the extraction reference position is slowest in the leading frame (first frame) of the non-specified period, and the moving speed sequentially increases in the frames thereafter, which is the opposite of the case of FIG. 6B. The moving speed graph displayed in FIG. 6D indicates that the moving speed becomes faster or slower in accordance with the shape of the moving speed graph. The user can freely change the shape of the moving speed graph by executing Touch-Move on the moving speed graph.

In step S703, the CPU 201 updates the extraction reference position of each frame of the non-specified period in the position setting data to the extraction reference position of each frame calculated in S702.

In step S704, the CPU 201 updates the display of the reproduction display area on the display control screen 600 displayed on the display 205, based on the specified data group and the position setting data, just like step S416. The CPU 201 also updates the display of the time line area 602 based on the specified data group.

In Embodiment 1, an example of the display control device 200 executing the display control processing, the moving image generation processing and the speed control processing have been described. However, the digital camera 100 may include at least a part of the configuration described in the description of the display control device 200, and execute these processing steps.

The CPU 201 may extract the angle-of-view region after performing the perspective projection transformation (coordinate transformation, so that the near object appears large and a distant object appears smaller, as in the case of human vision) on the VR content, and mapping the transformed VR content on the plane. The CPU 201 may extract the angle-of-view region without performing such image processing on the VR content. The present embodiment is also applicable to an image having a wide region (angle-of-view), or the like, instead of the VR content.

As described above, according to the present embodiment, the user can easily set the specified period, which is a period when the extraction reference position is maintained. Further, the specified period and the non-specified period are displayed separately in the time line area. Hence, the user can easily recognize the specified period, and can easily set or change the specified period.

This makes it easy for the user to set the extraction reference position to a desired position. As a consequence, the user can easily select a part of a region (region to be extracted) from the content.

As long as a region in a range existing in a direction to be the extraction reference in the virtual space can be extracted (selected) from the VR content, the "extraction reference direction" may be used instead of the "extraction reference position". In this case, for the specified direction, the user specifies the direction of maintaining the extraction reference position that is set in the specified period. In this way, any reference may be used instead of the "extraction reference position", as long as this reference can be used to determine an angle-of-view region in the VR content.

According to the present invention, the user can easily select a part of a region of the content.

Whereas, the present invention has been described based on the preferred embodiments thereof, the present invention is not limited to these specified embodiments, and various modes in a scope not departing from the spirit of the invention are also included in the present invention. Further, parts of the above embodiments may be combined as required.

In the above description, "processing advances to step S1 if A is B or more, and advances to step S2 if A is smaller (lower) than B" may be interpreted as "processing advances to step S1 if A is greater (higher) than B, and advances to step S2 if A is B or less". Conversely, "processing advances to step S1 if A is greater (higher) than B, and advances to step S2 if A is B or less" may be interpreted as "processing advances to step S1 if A is B or more, and advances to step S2 if A is lesser (lower) than B". In other words, as long as inconsistency does not occur, "A or more" may be interpreted as "greater (higher; longer; larger; more) than A", and "A or less" may be interpreted as "smaller (lower; shorter; less) than A". Further, "greater (higher; longer; larger; more) than A" may be interpreted as "A or more", and "lesser (lower; shorter; smaller) than A" may be interpreted as "A or less".

Other Embodiments

Embodiment(s) of the present invention can also be realized by a computer of a system or an apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., an application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., a central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An electronic device that reproduces a moving image content, the electronic device comprising:
    a processor; and a memory storing a program which, when executed by the processor, causes the electronic device:
    to control operation to sequentially display a plurality of frame images included in the moving image content on a screen and display a time line area, which corresponds to a reproduction period of the plurality of frame images, on the screen;
    for a third frame image, of which a reference position has not been set yet, existing between a first frame image and a second frame image, which are two frame images of which reference positions have been set, to calculate a position on a track connecting a first reference position of the first frame image and a second reference position of the second frame image;
    to automatically set the calculated position as a third reference position of the third frame image;
    for a plurality of fourth frame images existing in a specified period, which is specified in the time line area in accordance with an operation by a user, to automatically set one fourth reference position which is specified in accordance with an operation by the user so that the one fourth reference position is maintained;
to control operation to display the specified period and other periods separately in the time line area on the screen; and
to control operation to reproduce the moving image content by sequentially displaying regions corresponding to reference positions which are set for the plurality of frame images respectively on the screen.

2. The electronic device according to claim 1, wherein a plurality of specified periods exist in the moving image content, where the first frame image is a last frame image of a first specified period, and the second frame image is a leading frame image of a second specified period which is after the first specified period, and
the first reference position, which is the fourth reference position of the first frame image is different from the second reference position, which is the fourth reference position of the second frame image.

3. The electronic device according to claim 1, wherein the program which, when executed by the processor further causes the electronic device:
to set a reference position in one frame image out of the plurality of frame images displayed on the screen, in accordance with an operation by the user, and
to the first frame image and the second frame image are displayed on the screen, and the reference positions in the first frame image and the second frame image are set in accordance with operations by the user.

4. The electronic device according to claim 1, wherein the program which, when executed by the processor further causes the electronic device to change the third reference position from the first reference position to the second reference position along with an elapse of a reproduction time of the moving image content, in a case when the first frame image exists before the second frame image.

5. The electronic device according to claim 1, wherein a graph indicating a speed of a change of the reference position in the other period is displayed on the other period in the time line area, and
the program which, when executed by the processor further causes the electronic device to determine the reference position of a frame image corresponding to each reproduction time in the other period based on a shape of the graph.

6. The electronic device according to claim 5, wherein the shape of the graph is changeable in accordance with an operation by the user.

7. The electronic device according to claim 1, wherein the program which, when executed by the processor further causes the electronic device to, in a state when maintaining of the reference position is set for a plurality of specified periods, change lengths of at least two periods, which the user selected out of the plurality of specified periods, to be same lengths when a first operation is performed by the user.

8. The electronic device according to claim 1, wherein the program when executed by the processor causes the electronic device:
(1) to select a plurality of reproduction times by selecting one reproduction time every predetermined time out of a reproduction period of the moving image content, and
(2) to control so that a region corresponding to each of the plurality of reproduction times selected from the moving image content respectively is arranged and displayed in the time line area in order of reproduction time.

9. The electronic device according to claim 8, wherein the region corresponding to each of the plurality of reproduction times is a region corresponding to the reference position associated with each of the plurality of frames corresponding to the plurality of reproduction times.

10. The electronic device according to claim 1, wherein the program when executed by the processor causes the electronic device to (1) to control operation so that a region, which is a part of a region of the moving image content and corresponds to a reference position of a current reproduction time, is displayed in a predetermined area, and (2) to control operation, so that in a case when the current reproduction time is included in the specified period, a predetermined display item is displayed in the region.

11. The electronic device according to claim 1, wherein the moving image content is a moving image of an omnidirectional image, or a moving image of a panoramic image.

12. The electronic device according to claim 1, wherein the plurality of frame images included in the moving image content are omnidirectional images, and
the program, when executed by the processor further causes the electronic device to perform zenith correction for each of the frame images.

13. The electronic device according to claim 12, wherein the zenith correction is performed for the fourth frame image out of the plurality of frame images included in the moving image content.

14. The electronic device according to claim 1, wherein the program when executed by the processor causes the electronic device:
to extract, from the plurality of frame images included in the moving image content, a region corresponding to the reference position that is set for each of the plurality of frame images, and
to generate a new moving image content which includes images of the extracted regions in a time series.

15. A method of controlling an electronic device that reproduces a moving content, the method comprising steps of:
controlling operation to sequentially display a plurality of frame images included in the moving image content on a screen, and display a time line area, which corresponds to a reproduction period of the plurality of frame images, on the screen;
for a third frame image, of which a reference position has not yet been set, existing between a first frame image and a second frame image, which are two frame images of which reference positions have been set, calculating a position on a track connecting a first reference position of the first frame image and a second reference position of the second frame image;
automatically setting the calculated position as a third reference position of the third frame image;
for a plurality of fourth frame images existing in a specified period, which is specified in the time line area in accordance with an operation by a user, automatically setting one fourth reference position which is specified in accordance with an operation by the user so that the one fourth reference position is maintained;
controlling operation to display the specified period and other periods separately in the time line area on the screen; and
controlling operation to reproduce the moving image content by sequentially displaying regions corresponding to reference positions which are set for the plurality of frame images respectively on the screen.

16. A non-transitory computer readable medium that stores a program, wherein the program causes a computer to execute a control method of an electronic device, the control method is a method for controlling an electronic device that reproduces a moving image content, the control method comprising steps of:
controlling operation to sequentially display a plurality of frame images included in the moving image content on a screen, and display a time line area, which corresponds to a reproduction period of the plurality of frame images, on the screen;
for a third frame image, of which a reference position has not yet been set, existing between a first frame image and a second frame image, which are two frame images of which reference positions have been set, calculating a position on a track connecting a first reference position of the first frame image and a second reference position of the second frame image;
automatically setting the calculated position as a third reference position of the third frame image;
for a plurality of fourth frame images existing in a specified period, which is specified in the time line area in accordance with an operation by a user, automatically setting one fourth reference position which is specified in accordance with an operation by the user so that the one fourth reference position is maintained
controlling operation to display the specified period and other periods separately in the time line area on the screen; and
controlling operation to reproduce the moving image content by sequentially displaying regions corresponding to reference positions which are set for the plurality of frame images respectively on the screen.

\* \* \* \* \*